United States Patent [19]
Cawthon

[11] Patent Number: 5,555,681
[45] Date of Patent: Sep. 17, 1996

[54] MODULAR BUILDING SYSTEM

[76] Inventor: Mark A. Cawthon, c/o Modular Systems, Inc., 360 E. 3060 N., Provo, Utah 84504

[21] Appl. No.: 498,562

[22] Filed: Jul. 6, 1995

[51] Int. Cl.⁶ .............................. E04H 15/00; E04B 1/343
[52] U.S. Cl. .................... 52/63; 52/79.5; 52/222; 52/82; 160/120; 135/119; 135/903
[58] Field of Search .................... 52/63, 64, 79.5, 52/222, 82; 160/120, 268.1, 267.1; 135/903, 907, 909, 115, 119, 156; 47/17 R, 17 SC, 17 FM

[56] References Cited

U.S. PATENT DOCUMENTS

| | | | |
|---|---|---|---|
| 1,925,815 | 9/1933 | Nicolson | 135/903 X |
| 2,104,648 | 1/1938 | Hickey | 160/120 X |
| 2,961,255 | 11/1960 | Trott | 52/63 X |
| 4,188,764 | 2/1980 | Gode . | |
| 4,364,206 | 12/1982 | Wybauw . | |
| 4,864,783 | 9/1989 | Esposito | 52/86 |
| 5,038,517 | 8/1991 | Talbott | 52/63 X |
| 5,097,643 | 3/1992 | Wittler . | |
| 5,136,822 | 8/1992 | Blum . | |
| 5,170,600 | 12/1992 | Terrell . | |
| 5,216,834 | 6/1993 | Crowley | 52/63 X |
| 5,339,581 | 8/1994 | Schlickenmeyer . | |

Primary Examiner—Robert Canfield
Attorney, Agent, or Firm—Richard C. Litman

[57] ABSTRACT

A modular building system is adapted for the construction of various temporary and semi-permanent relatively light structures, such as yard storage sheds, greenhouses, gazebos, sun rooms and the like. The system includes various modular framing elements, with base and header plate components each containing a integral roller having an extendible and retractable flexible wall or roof panel respectively attached thereto. Thus, the frame members may be assembled to form the desired structure, with the wall and roof panels being selectively extended from the base and header plate members as desired to close various respective wall or roof portions of the structure as desired. The extendible and retractable wall and roof panels may be formed of transparent, translucent, or opaque thin and flexible sheet materials as desired, either of woven or non-woven materials, metal or plastic screen, etc. The frame components are preferably formed of a plastic such as polyvinyl chloride; other materials may be used. The wall and roof panels may be sealed respectively to the stud and rafter members, to preclude entry of dust, rain, insects, and/or other undesirable elements and to form a weather tight structure.

20 Claims, 12 Drawing Sheets

MODULAR BUILDING SYSTEM

FIELD OF THE INVENTION

The present invention relates generally to prefabricated, temporary and semi-permanent building structures, and more specifically to a modular building construction system useful for the construction of garden sheds, gazebos, sun rooms, and other light residential structures. The system includes framing members and connectors therefor, with at least some of the framing members including selectively extendible and retractable rolled wall partitions therein, thus providing for selectively openable and closable wall and roof panels in the present building system.

BACKGROUND OF THE INVENTION

Many, if not most, homeowners are interested in various home improvements, and often are in need of additional supplementary structures or outbuildings on their residential property. As tools and equipment are acquired (garden tractors, powered tillers, and other tools and equipment), a need often arises for a storage space which is reasonably secure from weather and other hazards. Similarly, many homeowners are also interested in other outdoor additions to their property, from decks to gazebos to sun rooms to various other relatively light and temporary or semi-permanent structures.

As a result, many relatively small prefabricated structures metal, wood, and/or fiber glass or the like, have been developed for such purposes. In most cases, the walls of such structures are fixed, and wall panels cannot be selectively and temporarily opened and closed, resulting in relatively dark storage sheds and the like, which often build up relatively high humidity therewithin which can be damaging to equipment and articles stored therein. Unfortunately, there is little that can be done to alleviate this problem with such storage sheds and the like.

Other structures (gazebos, sun rooms, etc.) often include open panels, but generally these panels cannot be selectively closed. In some instances, shades or curtains may be installed for privacy or shade, but these components are not a part of the structure, and do not provide secure sealing or closure of the structure as a permanent wall panel would.

Accordingly, a need will be seen for a modular building system which may be used to construct any of the above mentioned temporary or semi-permanent structures, as well as others including framed tents and the like. The system must provide for at least some selectively openable and closable wall and/or roof panels, whereby such panels may be opened as desired for the entrance of light and for air circulation, but which may also be closed and sealed to preclude the entrance of wind, dust, rain, insects, etc. The selectively openable and closable panels must be integrally incorporated with structural members of the construction system, for simplicity in the construction process. Finally, the system must further include all appropriate connectors and other structural elements required for the construction of structures utilizing the present modular building system.

DESCRIPTION OF THE PRIOR ART

U.S. Pat. No. 4,188,764 issued to Charles R. Gode on Feb. 19, 1980 describes a Prefabricated Greenhouse Structure which in one embodiment, includes a plurality of channel members in which fabric or flexible wall and roof panel sheets are clipped by means of splines forced into grooves and clamping the edges of the sheet members therein. As such, the panels are not selectively openable and closable, but are permanently installed, at least to the degree of permanence of the Gode structure. The flexible panels are separate components from the structural members, and are not integrally incorporated therein, as in the present invention where the flexible panels may be retracted into the structural members or extended therefrom.

U.S. Pat. No. 4,364,206 issued to Jacques Wybauw on Dec. 21, 1982 describes Prefabricated Building Units For Constructed Building, And Buildings Whose Fabric Comprises Assembled Units Of This Kind. The term "fabric" as used in the Wybauw disclosure, is used only in the sense of the construction of the structure, and the structural pattern of the structure. No flexible, woven fabric material is used by Wybauw. In fact, no flexible panels of any sort are used by Wybauw, as his building system is intended for the construction of permanent structures, some having multiple stories. The use of lightweight, tubular framing elements for vertical and horizontal framing members, as provided in the present invention, is not disclosed by Wybauw, nor is the use of any selectively openable and closable flexible panels, much less any such panels which may be retracted and stored within any of the structural members, as provided by the present modular building system.

U.S. Pat. No. 5,097,643 issued to Waldemar E. Wittier on Mar. 24, 1992 describes Interlocking Structural Members With Edge Connectors, wherein mating identical flexible edge connectors are interlocked to secure adjoining solid panels together. The interlocking system is more akin to that used for railroad car couplings, than to the configuration of the interlocking components of the present invention. Moreover, Wittier discloses only interlocking panels end to end, with no means provided for liking panels to extend upward to form a roof, as provided by the present building system. Wittier fails to disclose the use of any flexible wall or roof panels, much less any means of selectively retracting and extending such panels from an integral member of the structure.

U.S. Pat. No. 5,136,822 issued to Alan L. Blum on Aug. 11, 1992 describes Prefabricated Building Elements wherein each panel is constructed using metal framing and a conventional wallboard interior panel and a wire mesh and stucco composite exterior panel, between which insulation is installed. The result is a relatively thick, rigid, and permanent wall panel structure, completely unlike the present thin, flexible and selectively retractable and extendible wall panels of the present invention. The Blum prefabricated structure is intended to form a permanent structure, as in the case of the Wybauw construction system discussed above, rather than a temporary or semi-permanent structure which may be easily disassembled for storage or reassembly at another location, a provided by the present modular building system. Moreover, Blum fails to disclose any roof panels, and utilizes conventional threaded fasteners for much of the assembly of his structure, unlike the present modular building system.

U.S. Pat. No. 5,170,600 issued to Mark Terrell on Dec. 15, 1992 describes a Prefabricated Housing Addition for the construction of a permanent addition (porch, additional room, etc.) to a home or other permanent structure. The materials used are conventional, but include dovetail joints for assembly. No disclosure of retractable and extendible flexible wall panels is made by Terrell, nor are any tubular framing elements or specialized connectors therefor, disclosed. The Terrell structure cannot be easily disassembled for storage or reassembly on another site, as provided by the present modular building system.

Finally, U.S. Pat. No. 5,339,581 issued to Glen A. Schlickenmeyer on Aug. 23, 1994 describes a Modular Deck Flooring System wherein a plurality of deck boards are nailed together laterally, and the assembly is then bolted or screwed in place to the underlying joists. The assembly is intended to be permanent, although the mechanical fasteners used to secure each module to the joists may be removed. The materials are conventional (wood with metal fasteners), and form a heavy structure that is not suitable for the walls or roof of a temporary or semipermanent, disassembleable structure, as provided by the present modular building system. Moreover, the present system is not adaptable to use in flooring, due to the relatively thin and flexible retractable and extendible wall panels of the present modular building system.

None of the above noted patents, taken either singly or in combination, are seen to disclose the specific arrangement of concepts disclosed by the present invention.

SUMMARY OF THE INVENTION

By the present invention, an improved modular building system is disclosed.

Accordingly, one of the objects of the present invention is to provide an improved modular building system which is adaptable to the construction of temporary and semi-permanent, relatively light outbuildings, such as gazebos, greenhouses, storage sheds, sun rooms, framed tents, and the like, and which may be adaptable to the construction of other structures as well.

Another of the objects of the present invention is to provide an improved modular building system which utilizes structural members comprising plate, stud, rafter, and ridge members and connectors therefor which are preformed for ease of assembly.

Yet another of the objects of the present invention is to provide an improved modular building system which includes flexible wall and roof panels which may be selectively extended from and retracted into plate members of a structure formed using the present modular building system.

Still another of the objects of the present invention is to provide an improved modular building system which wall and roof panels may be sealed to their respective stud and rafter members to preclude entrance of wind, dust, rain, insects, and other undesirable foreign matter into a structure constructed using the present modular building system.

A further object of the present invention is to provide an improved modular building system which may include a modular door panel including a hinged door therein, to provide conventional access to the interior of a structure constructed according to the present modular building system.

An additional object of the present invention is to provide an improved modular building system in which the retractable and extendible flexible panels may be formed of opaque, translucent, or transparent materials as desired, and may be formed of plastic, woven natural or synthetic fabric materials, plastic or metal screen, or other flexible sheet material, as desired.

Another object of the present invention is to provide an improved modular building system which structural members may be formed of a plastic material, such as polyvinyl chloride, or other materials as desired.

A final object of the present invention is to provide an improved modular building system for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
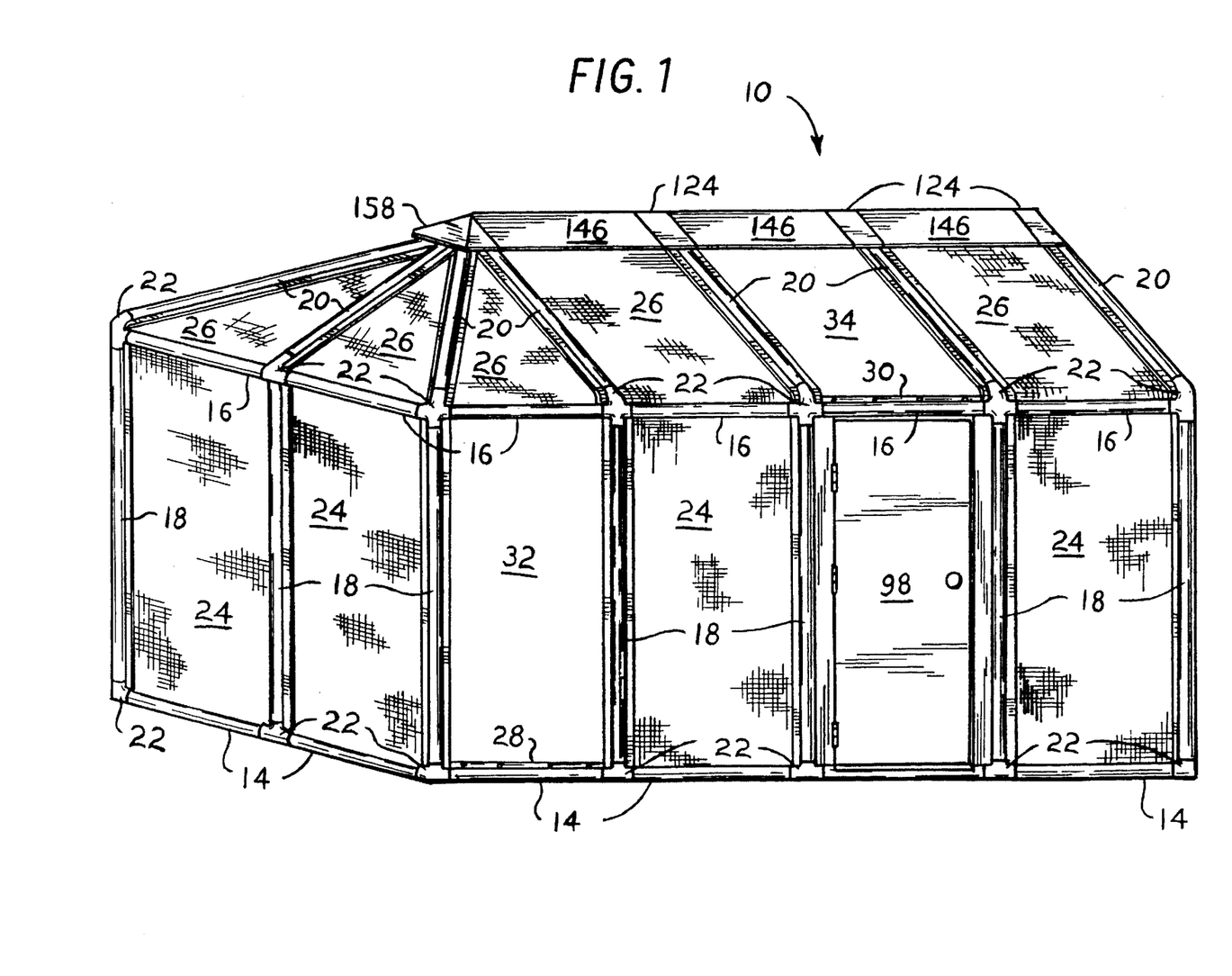
FIG. 1 is a perspective view of a typical structure which may be constructed using the present modular building system, showing the retractable nature of the wall and roof panels used therein and the construction of a gabled roof structure with hip roof structure on one end thereof.
Figure 2:
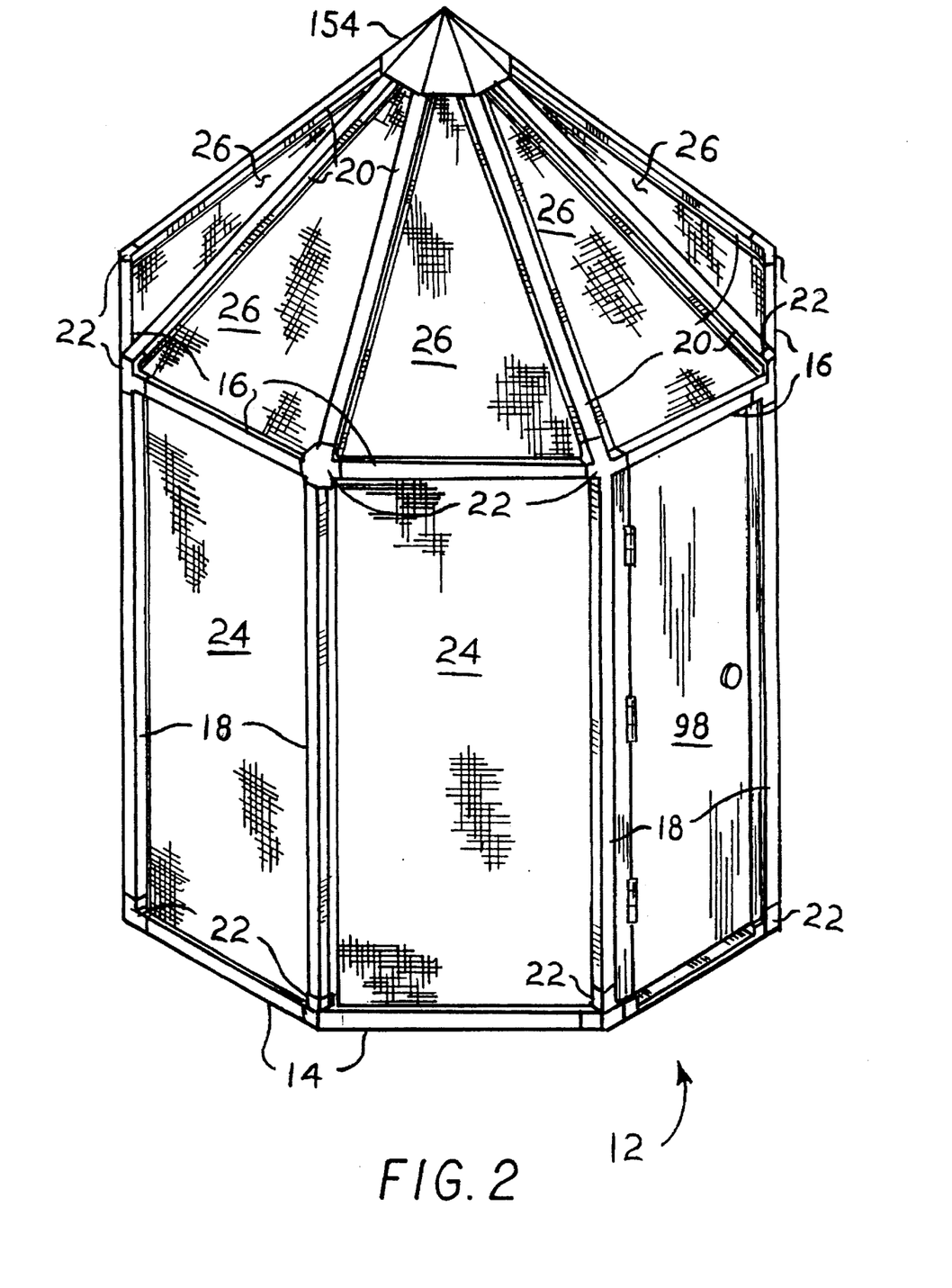
FIG. 2 is a perspective view of another type of structure constructed according to the present system, showing an octagonal gazebo type building.

Referring now particularly to FIGS. 1 and 2 of the drawings, the present invention will be seen to relate to a modular building system, providing for the construction of relatively lightweight, temporary or semi-permanent structures such as the gabled shed or greenhouse 10 of FIG. 1, or the octagonal gazebo 12 of FIG. 2. (It will understood that the shed 10 and gazebo 12 are exemplary, and that a myriad of other structural configurations and structures may be assembled using the modular system and components of the present invention.) The structures formed using the present system are each constructed using a plurality of foundation or base plate members 14, header plate members 16, generally vertical stud members 18 extending between the base plates 14 and headers 16, rafter members 20 generally defining the roof structure of any structures constructed according to the present system, and a plurality of connectors 22 serving to join or connect the various base members 14, header members 16, stud members 18, and rafter members 20 together, as appropriate for a given structure.

Figure 3:
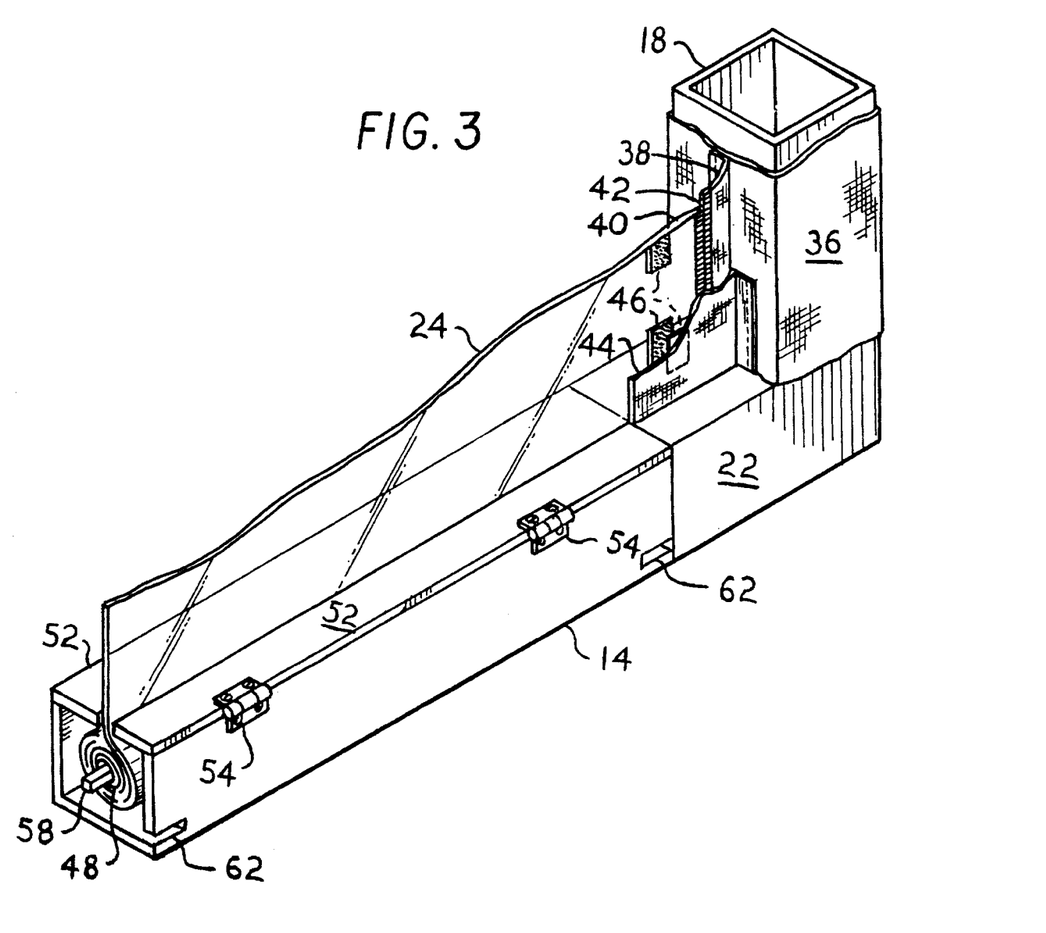
FIG. 3 is a detail perspective view in section of one of the base plate modular units and an adjoining stud modular unit, showing details of the extension and retraction of a flexible wall panel from the plate unit and the sealing attachment of the wall panel to the stud unit.
Figure 4:
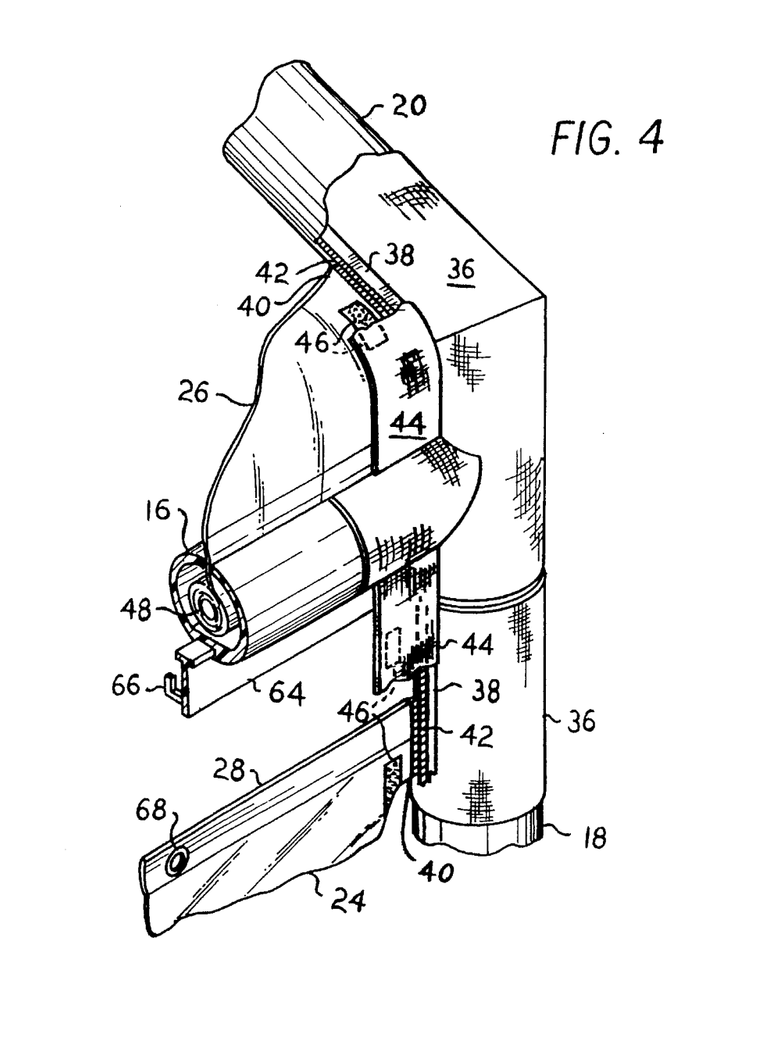
FIG. 4 is a detail perspective view in section of the upper portion of a wall, showing details of a header plate unit and a rafter unit and the extension of a roof panel from the header plate unit as well as further details.

Each of the plate members 14 and 16, studs 18, and rafters 20 is preferably formed of an elongate hollow tube, which may have a rectangular or square cross section (e.g., the gazebo 12 of FIG. 2, and the base plate and stud detail of FIG. 3) or a round cross section (e.g., the gabled structure 10 of FIG. 1 and the header and rafter detail of FIG. 4). Connectors 22 have an identical internal cross sectional shape in order to provide for the secure connection of the various components together. Other cross sectional shapes (e.g., oval, hexagonal, octagonal, etc.) may be substituted as desired, so long as all components of any given structure have the same shape for compatibility in assembly.

Each of the above components is preferably formed of a plastic material of some sort. It has been found that polyvinyl chloride (pvc) plastics, particularly in high density configuration, are quite suitable for use in the manufacture of the components of the present structure, as they are impervious to corrosion and hold up well in extremes of sunlight, weather, and other conditions. Other materials may be substituted for the above pvc or other plastics, as desired.

The connectors 22 may be formed to have different included angles, depending upon the configuration of the structure in which they are to be used. For example, the rectilinear structure of FIG. 1 would utilize eight corner connectors (four upper and four lower) each having a 90 degree included angle and a plurality of other connectors having a straight base connection line, while the octagonal gazebo of FIG. 2 would utilize sixteen identical connectors (eight upper and eight lower) each having a 135 degree included angle. Other structural shapes may be constructed, as noted above, e.g., a structure having a hexagonal plan and utilizing connectors having an included angle of 120 degrees, etc. However, in each case the configuration of the interlocking connecting means with the plate members 14 and 16, is essentially identical, as will be explained further below.

The wall panels 24 and roof panels 26 of the structures constructed according to the present invention, are selectively extendible from and retractable into the respective associated base plate members 14 and header plate members 16, as will be described further below. The panels 24 and 26 may be formed of any of a number of different transparent, translucent, and/or opaque sheet materials, either as non-woven sheets or as woven fabric materials. Plastic and metal screens may also be used to form the panels 24 and 26, as desired, and the panels 24/26 may include a design or designs thereon (not shown), depending upon the nature of the material used for the panels 24/26 and other factors.

In FIG. 1, a plurality of wall panels 24 and roof panels 26 are shown in their extended mode, respectively from their associated base plates 14 and header plates 16. However, as noted above, such panels 24/26 may be selectively extended or retracted as desired, and one wall panel and one roof panel are shown retracted, with only the uppermost attachment edge (respectively 28 and 30) shown adjacent to their respective plate members 14/16 to provide a wall opening 32 and a roof opening 34.

While in a gabled structure many, if not most, of the roof panels 26 may have a rectangular shape similar to that of the wall panels 24, it will be seen that in the case of the end of a hip roof structure, as in the left end of the roof of the structure 10 of FIG. 1, or in the case of a roof having a single apex, as in the roof of the octagonal gazebo 12 of FIG. 2, that the roof panels 26 will have a triangular shape to conform to the triangular opening of such roof structures. As the present roof panels 26 are formed of flexible sheet materials of various sorts, they may be easily cut and trimmed to provide a shape which tapers toward the apex, or whatever shape is required to close a given roof opening.

Figure 5:
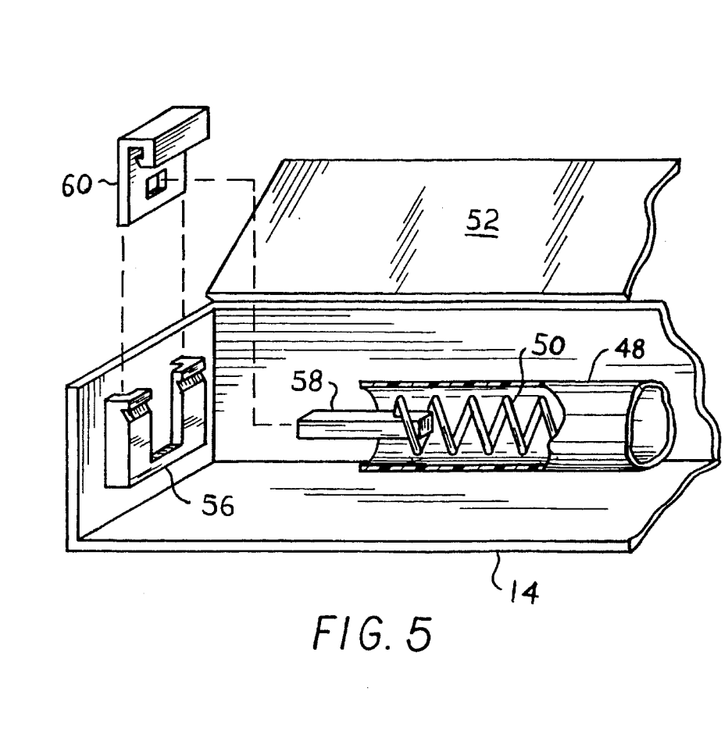
FIG. 5 is an exploded detail perspective view in section of the interior of a plate modular unit, showing the removable insertion and retaining means for a roller for a flexible wall panel therein.

The present modular building system provides for the essentially complete sealing of the interior of a structure constructed therefrom, to preclude entrance of wind, rain, dust, insects, and/or other undesirable elements, as desired. FIGS. 3 through 5 provide detailed views of the means provided for such sealing.

FIG. 3 discloses a detailed perspective view in section of a base plate member 14, stud member 18, and connector 22 which may be used to form a part of a structure according to the present modular building system. (While the components of FIG. 3 each have cooperating rectangular or square cross sections, it will be seen that the features described are equally adaptable to components having round or other cross sectional shapes.)

Also shown in FIG. 3 is the bottom portion of a sleeve 36, which is slipped over a corresponding stud member 18 during the assembly of a structure. The sleeve 36 is formed of a flexible material, and includes a pair of panel connecting flexible flanges 38 (only one of which is shown in FIG. 3) extending from the side of the sleeve 36. The edge of the connecting flange 38, and the corresponding connecting edge 40 of the panel 24, include a zipper 42 which may be zipped together when the panel 24 is extended, to seal the panel 24 to the adjacent sleeve flange 38 and sleeve 36. Additional sealing means may be provided by an overlying secondary flap 44, which serves to protect the zipper 42. The secondary flap 44 is secured to the edge of the panel 24 by mating hook and loop fastening segments 46 (e.g., Velcro™) or other suitable means.

The wall panel 24 of FIG. 3 is selectively extendible and retractable from a roller 48 housed within the hollow interior of the base plate member 14. A spring 50 (FIG. 5) biases the roller 48 to urge the wall panel 24 to a retracted position. Thus, an opening between base and header plate members 14 and 16, and stud members 18, may be closed as desired by extending the wall panel 24 from the base member 14 and securing the upper edge 28 to the overlying header plate member 16, and securing the zipper 42 and flap 44 on each side of the panel 24, as shown in FIG. 4.

Preferably, the upper surface of the plate members 14 and 16 include a pair of openable access covers 52, as shown in the base plate member 14 of FIG. 3. The covers 52 may be secured to the edges of the member 14 by hinges 54, or other suitable means. Access to the roller 48, and to a panel 24 which may be rolled thereon, is provided by opening the access covers 52, whereby the roller 48 and associated wall panel 24 may be removed and replaced as desired. For example, it may be desirable to use screened wall panels during warmer summer months, and to replace those screened panels with transparent impervious plastic sheet panels during cooler times. The easy accessibility of the rollers 48 and associated wall panels 24 attached thereto, provide for the quick and easy exchange of wall panels 24 (or roof panels 26, for similarly constructed header plate members 16) as desired.

FIG. 5 provides a view of the retainer 56 for the roller shaft 58, which serves to retain a clip 60 therein. The clip 60 serves to preclude rotation of the shaft 58 relative to the spring 50 and roller 48, and to hold the roller 48 securely within the plate member 14. (No ratchet is provided for the roller to lock it at any particular position, as in a window shade, as the securing means for the panels 24/26 serves that purpose.) By removing the clip 60, the roller shaft 58 (and roller 48 and associated panel) may be lifted from the plate member, and replaced as desired. Alternatively, the base and header plate members 14 and 16 themselves may be removed in their entirety from the remainder of the structure, as explained further below. Drain holes 62 (FIG. 3) may also be provided near the bottom of the plate members, to allow water or other matter to escape which may enter the interior of the plate member through the upper wall or roof panel slot.

FIG. 4 provides a perspective view in section of a header plate member 16, stud member 18, and rafter member 20, each having a round cross section. A connector having a compatible shape and section is also provided, but is concealed beneath the sleeve component 36 in FIG. 3. It will be understood that the various sleeve components and panel edge securing means are essentially the same in FIG. 4 as those disclosed in FIG. 3, but are adapted to components having round sections rather than rectangular sections, and to a rafter member rather than to a stud member. The principles behind each of the similar components is essentially the same.

However, the header plate member 16 of FIG. 4 includes a panel connector strip 64 which installs within a slot or channel in the bottom of the header plate member 16. (Base plate members 14 may include similar channels for simplification of manufacturing, although they are not used in the base members 14.) The connector strip 64 includes a plurality of hooks 66, over which a corresponding number of grommets 68 disposed along the upper edge 28 of the wall panel 24. Further hook and loop fastener material (omitted for clarity, but similar to that used along the edges of the panels 24 and 26) may be used to seal the upper edge 28 of the panel 24 to the connector strip 64 to preclude the entrance of undesirable elements therein. The connector strip 64, with its hooks 66 and hook and loop fastening material, serves to hold the wall panel 24 (or roof panel 26, as will be explained further below) in a fully extended position, against the retracting pull of the roller spring 50. When it is desired to retract the panel 24/26, one may lift the upper edge 28 of the panel to disengage the grommets 68 from the hooks 66, unzip the zippers 42 along each panel edge 40, and allow the panel to retract into the plate.

Figure 7:
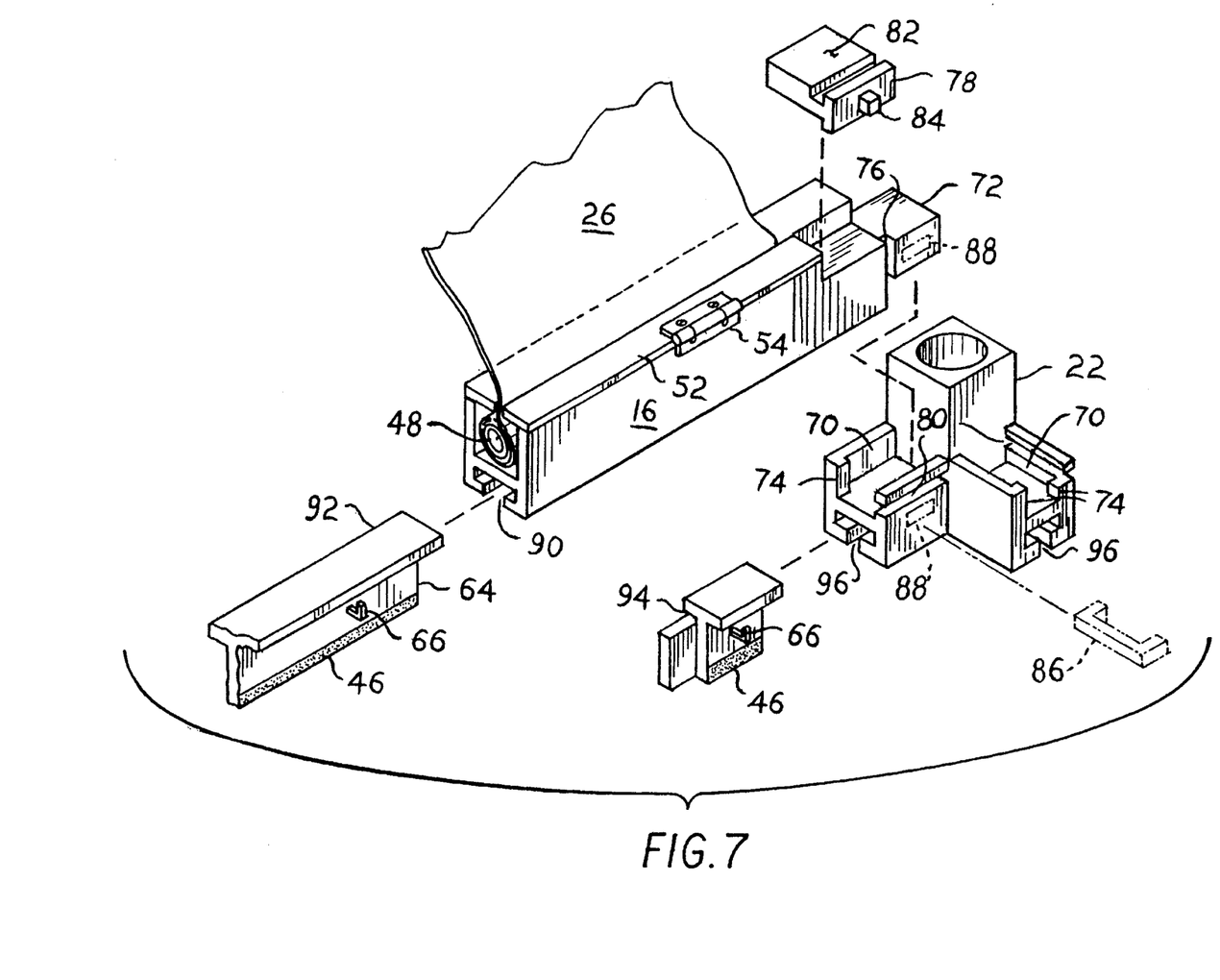
FIG. 7 is an exploded detail perspective view of the connector details and assembly of a plate unit with a mating connector unit of the present modular building system.

A more detailed exploded view of the general construction of the components of FIG. 4 is provided in FIG. 7. While FIG. 7 discloses a plurality of components having rectangular or square cross sections, it will be seen that the various details shown in FIG. 7 are also adaptable to components having round cross sections. The connector 22 of FIG. 7 includes an open slot 70 in each arm thereof, into which an end 72 of the adjoining plate member (a header plate member 16 in FIG. 7, but the configuration is identical for the attachment of a base plate member 14) is inserted from above. The plate member 16 is precluded from lateral withdrawal from the connector 22, by means of an inwardly facing ridge 74 at the edge of the slot 70, which is captured within a corresponding retaining slot 76 in the plate member 16.

The base or header plate 14/16 is prevented from being withdrawn upwardly from the connector slot 70, by means of a latch 78 which slidingly engages a latch slot 80 in each arm of the connector 22. The latch 78 includes a flange 82 which extends over the depressed end 72 of the plate member 14/16, in order to preclude upward movement thereof. A toggle 84 is provided for manipulation of the latch 78. Thus, the appropriate plate member 14 or 16 may be inserted into the adjoining connector 22 arm slot, the latch positioned adjacent the end 72 of the plate member, and moved laterally outward along the end of the plate member 14/16 to engage the latch slot 80 in the connector 22. Alternatively, a key 86 (shown in broken lines) may be provided, which inserts into a passage 88 (also in broken lines) through the side of the connector 22 and plate member end 72. The key 86 is removably inserted through the passage 88 to retain the end 72 of the plate member 14/16 within the connector slot 70, as desired.

The channel 90 formed in the bottom portion of the plate member 16 (which may also be formed in a base plate member 14 for ease of manufacturing, as noted above) is clearly shown in FIG. 7. The connector strip 64 includes a track 92, which slides into the channel 90 from either end of the header plate member 16. Thus, a wall panel 24 may be secured to the header plate member 16 by means of the hooks 66 and hook and loop fastener material 46 provided along the connector strip 64, in order to close the associated panel as desired. Adjoining end connector strips 94, with hook(s) 66 and hook and loop fastening 46, are inserted into the channels 96 of the connectors 22, to provide for complete closure and sealing of the associated wall panel 24, as desired.

The above plate member securing means will be seen to allow removal of both base plate members 14 and header plate members 16, from the associated structure without need for disassembly of any other structure. Thus, in the event that a plate member 14/16 must be removed for replacement (e.g., if roller 48 and wall/roof panel 24/26 removal and replacement within the plate member is not possible), one need only retract the appropriate panel 24/26 (if extended) as described above, slide the associated latches 78 (or keys 86) from each connector 22 at each end of the plate member 14/16, and lift the plate member 14/16 from the plate member end slots 70 within the connectors 22. The connector strip 64 may then be withdrawn from the channel 90 in the bottom of the header plate 16 (if a header plate member 16 is being removed), and inserted into a replacement header plate 16. The new or replacement header plate 16 (or base plate member 14, which does not require a connector strip 64) may then be installed within the opposite connectors 22, as described above, to complete the replacement.

Figure 6:
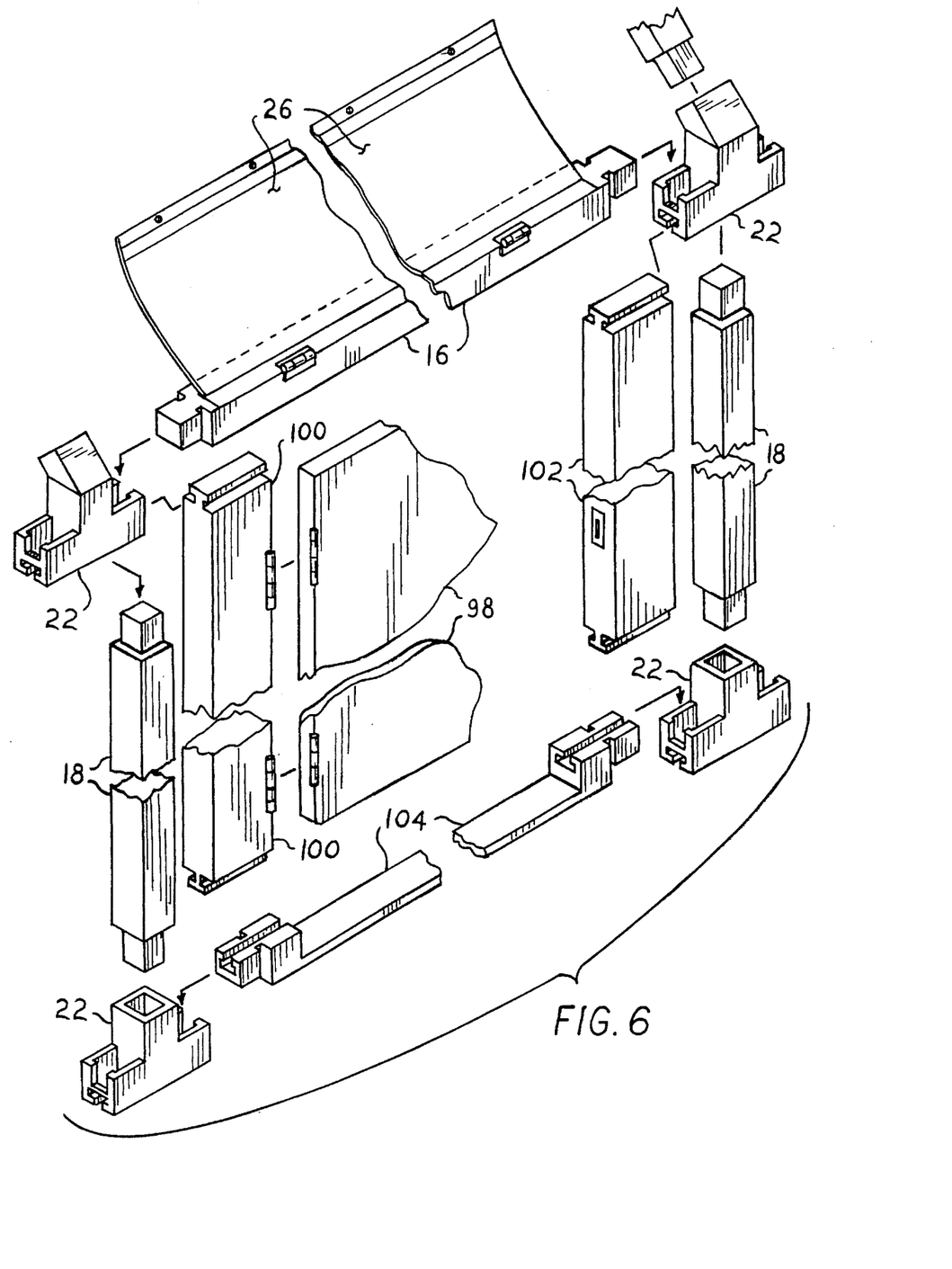
FIG. 6 is a broken and exploded detail perspective view of a door panel assembled from modular units of the present modular building system.

The means discussed further above providing for the securing of the wall panels 24 to the adjacent stud members 18 and header plate 16, will be seen to preclude entry into or exit from the present modular structure when all panels 24 are extended, without damage to the structure. Accordingly, some other means must be provided for entrance into and exit from the structure. FIG. 6 provides an exploded perspective view of a door module assembly which provides for entrance into and exit from a modular structure constructed according to the present invention, wherein all wall panels 24 have been extended and closed. (It should be noted that details of the header plate member 16 and associated connectors 22 which provide for the latching or securing of those components together, have been omitted for clarity in FIG. 6.)

The door module assembly includes a door 98 (shown fragmented in FIG. 6, but shown in its entirety in FIGS. 1 and 2), which is generally conventional in that it is a relatively rigid panel having a latch at one lateral edge and at least a pair of hinges at the opposite lateral edge. The door 98 is secured between a door frame hinge member 100 on one side, and a door frame latch member 102 on the opposite side. These door frame members 100/102 are in turn secured between a lower threshold member 104 (relatively low and thin, as it need not contain a roller 48 and wall panel 24) and an upper header plate member 16 by means of the track and channel system discussed above in the assembly of FIG. 7. The threshold member 104 and overhead header plate member 16 are in turn secured within connectors 22, with generally vertical studs 18 extending between lower and upper connectors 22. The assembly comprising the door 98, frame members 100/102, and threshold member 104 thus replaces a base plate member 14 and its wall panel 24, for access.

Figure 8:
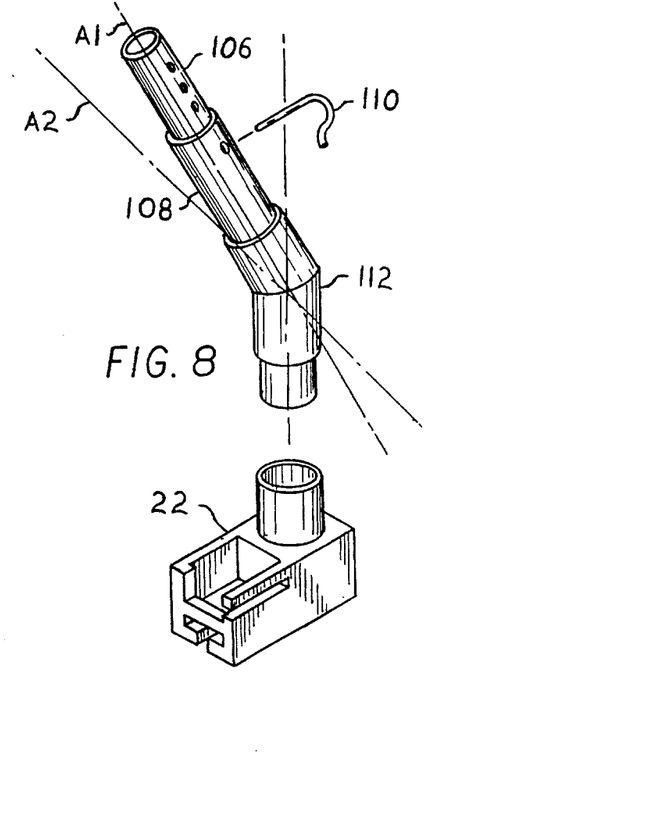
FIG. 8 is an exploded detail perspective view of the connector details and assembly of a telescoping rafter member with a mating connector of the present modular building system.

As noted above, the present modular building system includes provision for gabled and other sloped roof construction. While the rafter components of the gabled roof of a rectangular structure will all have the same length, the required length will vary depending upon the roof slope and the width of the structure. The rafter length will also vary for a hip roof structure as shown at the left end of the structure 10 of FIG. 1, between center rafters and hip rafters. The present construction system provides for this variation in rafter length by means of telescoping rafter components 106 and 108, as shown in FIG. 8. The telescoping components 106/108 may be locked at the desired length by means of a lock pin 110 inserted through concentric passages in the two components. The assembly is connected to a connector 22 by means of an angled adapter 112, which adapter may be formed to any desired angle A1, A2, etc. (It will be noted that the connector 22 provides for a rectangular cross section header plate, but a round section adapter and rafter. Such connectors may be provided in various configurations for either rectangular or square section stud members, header and base plate members, and/or rafters, as appropriate for the various structural components to be connected.)

Figure 9A:
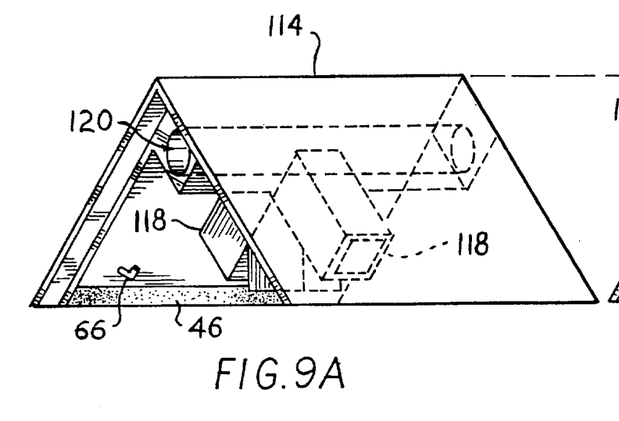
FIG. 9A is a detail perspective view of a roof ridge member including ridge support connection means for the present modular building system.
Figure 9B:
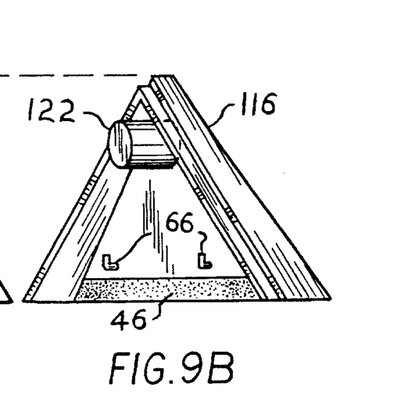
FIG. 9B is a detail perspective view of an end cap for the roof ridge member of FIG. 9A.

The rafter structure discussed above is connected at a roof ridge or apex, depending upon the specific configuration. FIGS 9A and 9B disclose one type of roof ridge connector member 114 and a roof ridge end cap 116, with the ridge connector 114 including rafter sockets 118 therein and a roof crest and end cap connector passage 120. The end cap 116 includes a mating extension 122 or other means providing connection to the ridge connector 114, and both components include hooks 66 and hook and loop material 46 for securing a rafter sleeve 36 or roof panel 26 thereto.

Figure 10:
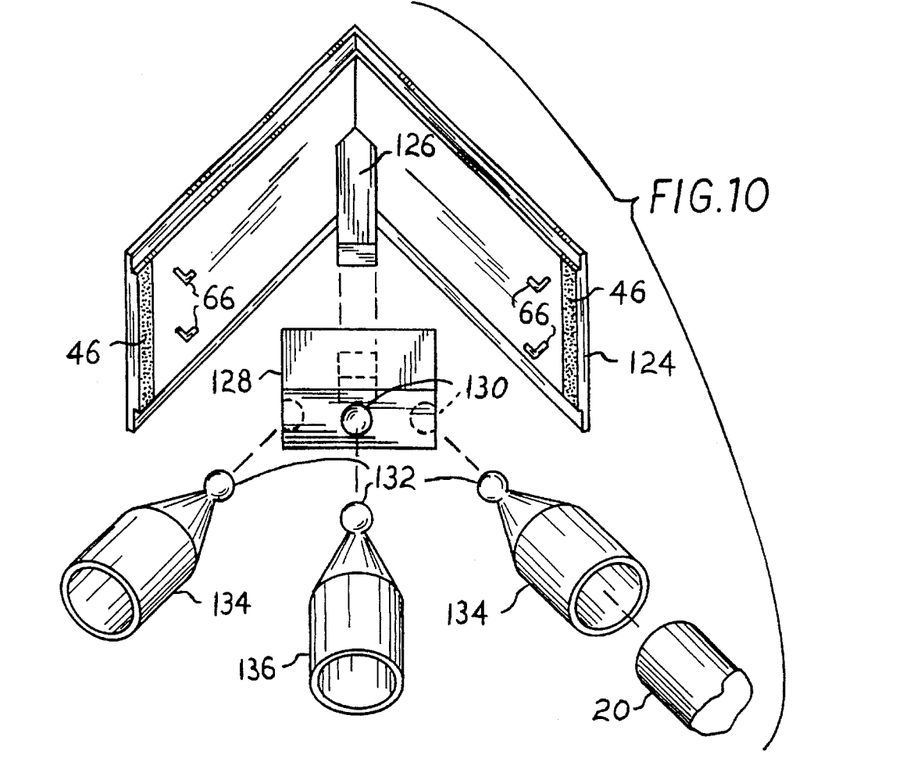
FIG. 10 is an exploded detail perspective view of the support and connector means used to support a roof ridge member and to connect rafter members thereto.

FIG. 10 discloses an alternative roof ridge connector 124, wherein only a single center connector post 126 is provided. The central connector post 126 provides for the attachment of an intermediate rafter and ridge adapter 128 thereto, which adapter 128 in turn includes a plurality of sockets 130 into which the spherical connector ends 132 of the rafter adapter ends 134 may be connected. The spherical joints provided by the sockets 130 and rafter adapter ends 134 allow various gable angles to be formed without need for a plurality of different roof ridge connector members 124 or intermediate adapters 128.

FIG. 10 also discloses a central support adapter 136, which is secured to a generally vertical central support column 138 (FIG. 11) for additional support of the roof structure of the a structure constructed according to the present modular building system. A central spherical socket 130, identical to the rafter sockets 130, is provided in the rafter and ridge adapter 128, with the spherical connector end 132 of the central support adapter 136 (essentially identical to the rafter adapter ends 134) being inserted therein. The central support column adapter 136 is in turn secured to the upper end of a central support column 138, to provide further support for the roof of the structure.

Figure 11:
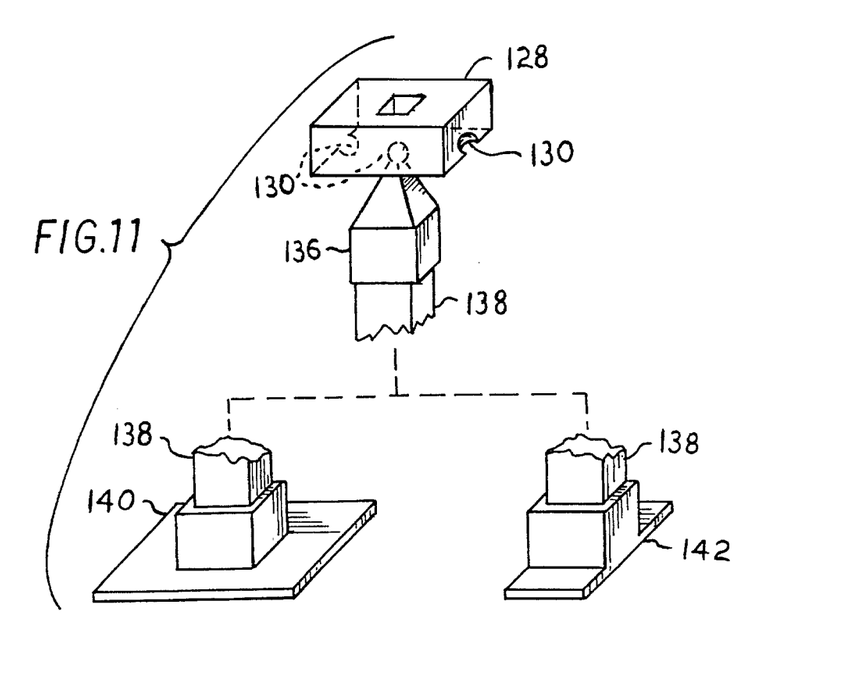
FIG. 11 is a broken perspective view of alternative central support members which may be used as the central ridge support of FIG. 10.

The bottom end of the support column 138 is in turn supported by a relatively wide support column base 140 or 142 (having a wide or narrow base, respectively, depending upon the room available) to spread the load of the support column 138. It will be noted that the central support column adapters 136 and the support columns 138 to which they are secured, as well as the base components 140/142 and rafter end adapters 134, may have either a rectangular or round cross section, as desired.

Figure 12:
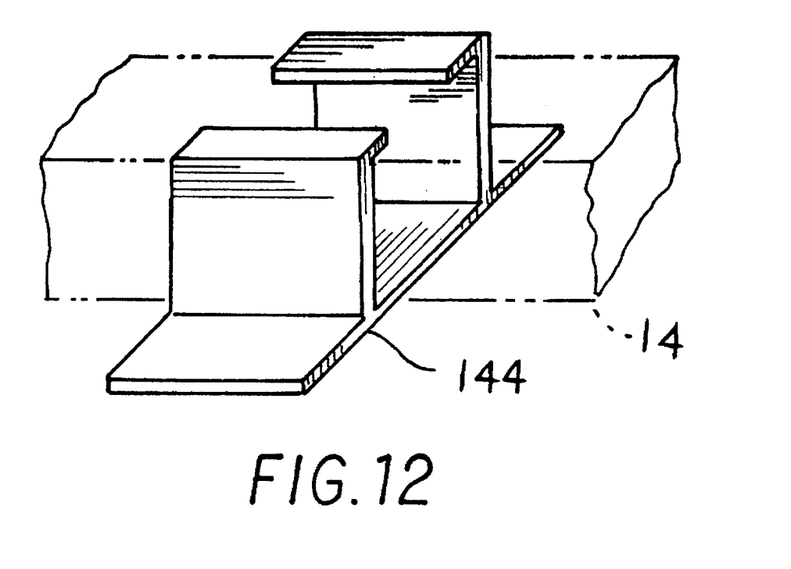
FIG. 12 is a perspective view of a base support component for a base plate.

FIG. 12 discloses a device which appears to be somewhat similar to the wide and narrow central support column bases 140 and 142 of FIG. 11, but which actually serves quite a different purpose. From the foregoing discussion of the present invention, it will be seen that the structures constructed therefrom are relatively lightweight, and that the extension of a wall (or roof) panel 24/26 from a respective plate member 14/16 against the biasing force of the roller spring 50 may tend to lift at least a portion of the remaining structure, as the plate members 14/16 are securely attached to the remainder of the structure by means of the locking components detailed in FIG. 7. Accordingly, it may be necessary to place some weight upon the underlying base plate member 14, in order to secure it (and the remainder of the structure to which it is secured) as a wall or roof panel 24/26 is extended.

The open channel and flange extension configuration of the base plate retainer 144 of FIG. 12 provides for such, without blocking the gap or opening in the top of the base plate 14 in order to allow free extension of a wall panel 24 therefrom. A person need only place some weight on one of the flanges of the base plate retainer 144, which is in turn secured about the base plate member 14 during assembly of the structure, in order to secure the structure as a wall or roof panel 24/26 is extended.

Figure 13:
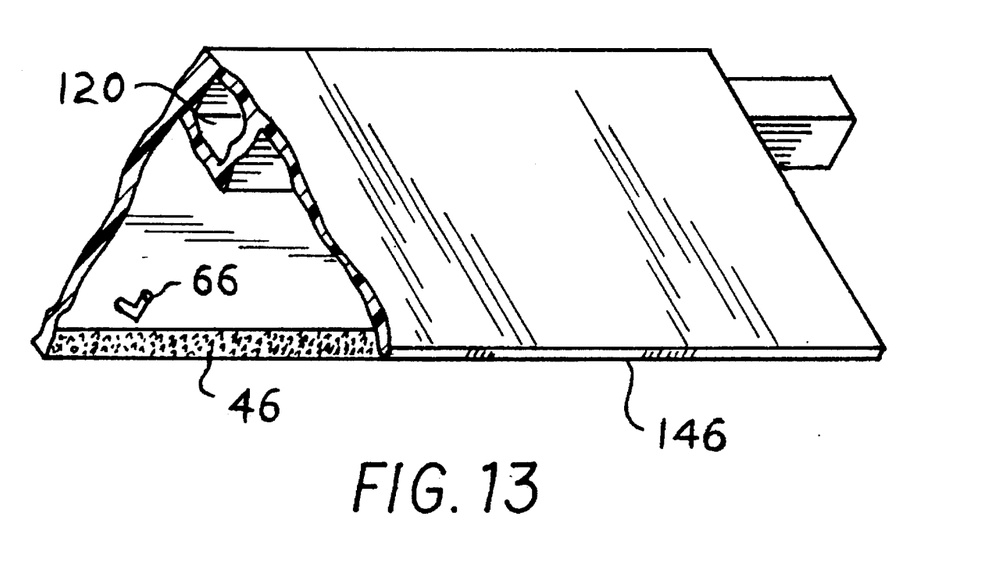
FIG. 13 is a detail perspective view in section of a roof ridge member, excluding the support sockets of the roof ridge member of FIG. 9A.

FIG. 13 discloses a roof ridge member 146, which is used to form the roof ridge or crest of a gabled structure, as in FIG. 1. The ridge member 146 is generally similar to the roof ridge connector 124 of FIG. 10, but is devoid of rafter connector means, as this function is provided by the ridge connectors 124. Other features, such as roof panel hooks 66, etc., are provided.

Figure 14A:
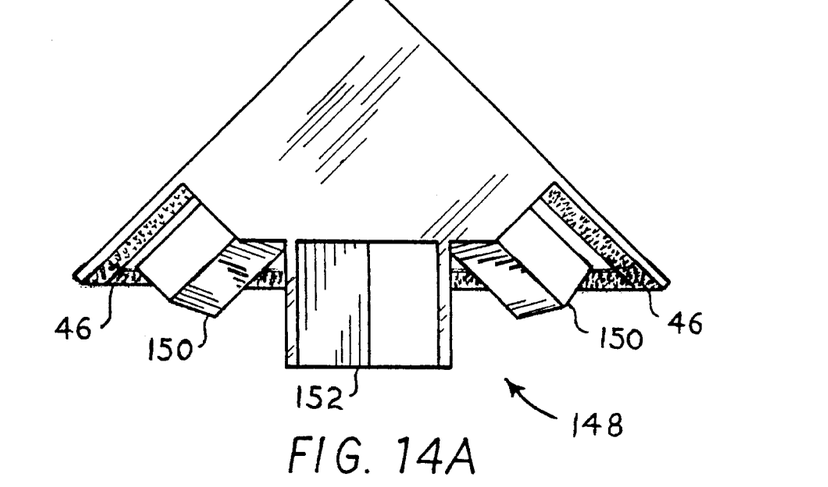
FIG. 14A is a side view in section of a tetrahedron roof connector cap of the present modular building system.
Figure 14B:
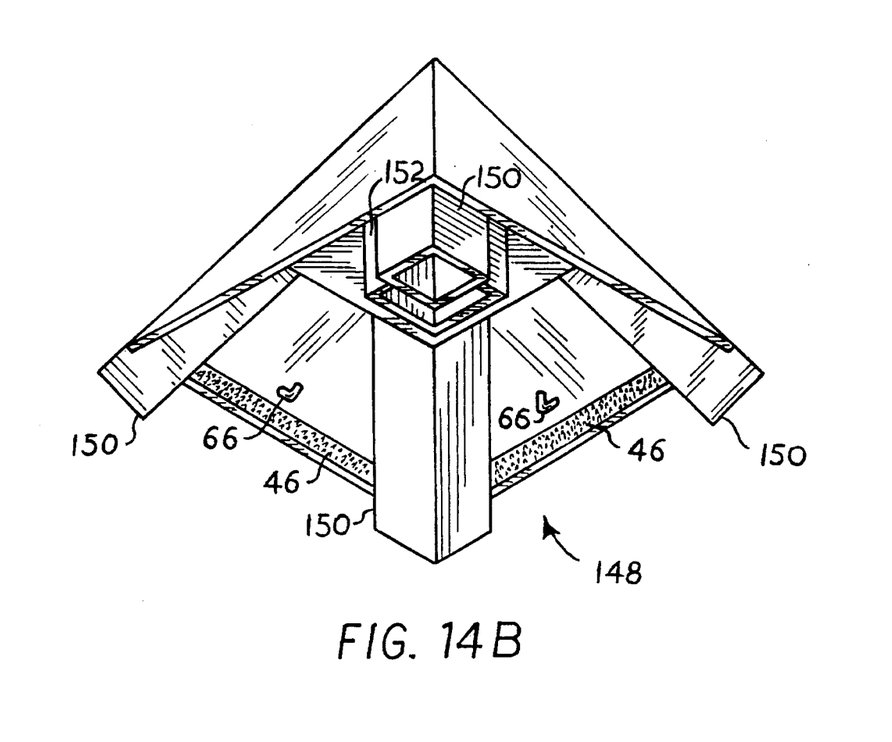
FIG. 14B is a bottom and side perspective view of the tetrahedron cap of FIG. 14A.

The present modular building system may also be used to construct structures having apexed roofs, as in the octagonal gazebo 12 of FIG. 2. However, various roof caps or apices may be provided, and are not limited to structures having eight sides. FIGS. 14A and 14B respectively provide an elevation view in section and a lower and side perspective view of a trapezoid apex or cap 148. The trapezoid cap 148 would be used as the apex of a four sided structure having a single roof apex, somewhat on the order of the gazebo 12 of FIG. 2, but with one half the number of sides and rafters. The cap 148 includes four rafter sockets 150, as well as a central support column socket 152, similar to the central support column socket adapter 136 of FIG. 11, but incorporated integrally into the trapezoid cap member 148. (It will be seen that spherical sockets and joints may be provided in the manner of the fittings disclosed in FIGS. 10 and 11 and discussed above, if desired.) Hooks 66 and hook and loop fastening material 46 are provided along the lower edge of the trapezoid cap member 148, for securing the upper edges of appropriately tapered or configured roof panels 26 thereto.

Figure 15A:
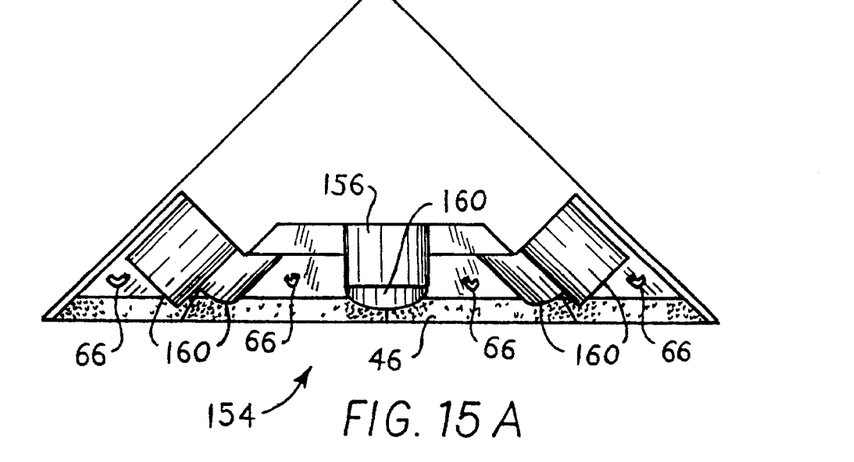
FIG. 15A is a side view in section of an octagon roof connector cap of the present modular building system, along line 15A—15A of FIG. 15B.
Figure 15B:
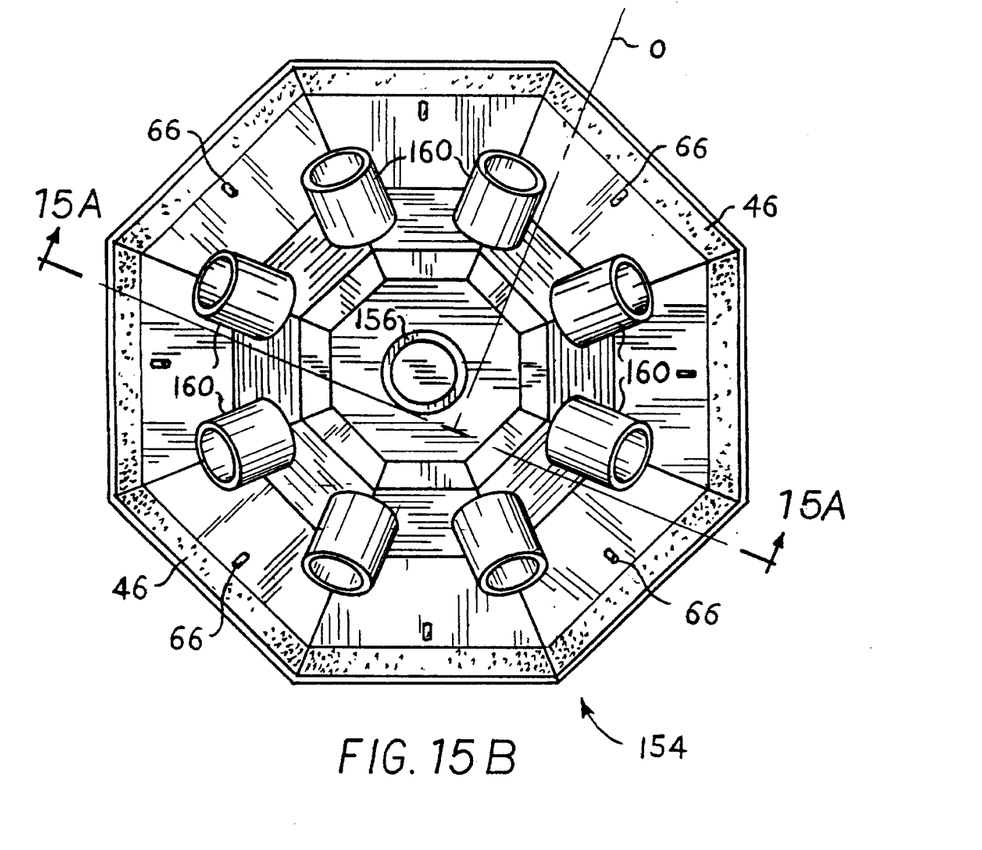
FIG. 15B is a bottom plan view of the octagon roof connector cap of FIG. 15A.

A variation on the above is provided by the octagonal apex or cap 154 of FIGS. 15A and 15B. FIG. 15A discloses an elevation view in section along line 15A—15A of FIG. 15B. However, line 15A—15A does not pass precisely through the center of the octagonal cap member 154, but rather is offset slightly in order to avoid passing through the central support column socket 156. This is done to indicate the "cut line," where such an octagonal cap 154 would be modified to form a hip roof end cap for a half octagonal gazebo structure (not shown). The complete octagonal cap 154 is used for the apex of the octagonal structure 12 of FIG. 2.

In a similar manner, another partial cap may be provided by separating the octagonal cap 154 along the line 15A—15A and further taking a section between the line 15A—15A and the line O. This essentially quarter section (but including the central support column socket 156) may serve as the apex for a quarter end structure for a shed like addition, as for the ends of a sun porch or the like. Other variations are of course possible, and in fact the trapezoid cap 148 of FIGS. 14A and 14B may be divided similarly in order to produce a hip roof end cap 158, as shown on the left end of the structure 10 of FIG. 1. (It is noted that although the term "cut" or "divide" has been used above to describe the portions of the trapezoid or octagonal caps 148 and 154 of different embodiments of the present invention, generally such partial octagonal or trapezoid components are cast or formed in their entireties, rather than being cut from a larger component.)

In other respects, the octagonal cap 154 (or partial variations thereof) will be seen to be similar to the trapezoid cap 148 of FIGS. 14A and 14B discussed above. The octagonal cap 154 also includes eight rafter sockets 160, in addition to the central support column socket 156 noted above, and a plurality of hooks 66 and hook and loop fastening material 46 disposed about the inner periphery of the cap 154. FIG. 2 provides a perspective view of an octagonal gazebo or other octagonal structure 12, wherein the octagonal cap of FIGS. 15A and 15B is used as an apex for the roof structure. The various roof panels 26, which are tapered to fit within the triangular openings defined by the rafters, are secured to the hooks 66 and fastening material 46 of the octagonal cap 154, to close the roof structure similarly to the means described above for gabled roof structures.

In the discussion further above of the gabled roof structure and components provided therefor, a variation was described and shown in FIG. 10 wherein the rafters 20 were provided with end fittings 134 having spherical fittings 132 thereon, with the fittings 132 being inserted into spherical sockets 130 in an adapter 128 which in turn secured to the gable connector member 124. This spherical joint attachment allows the rafters 20 to form any required angle with the roof ridge components, without need to supply a specific roof ridge gable connector having rafter sockets aligned to specific angles.

Figure 16:
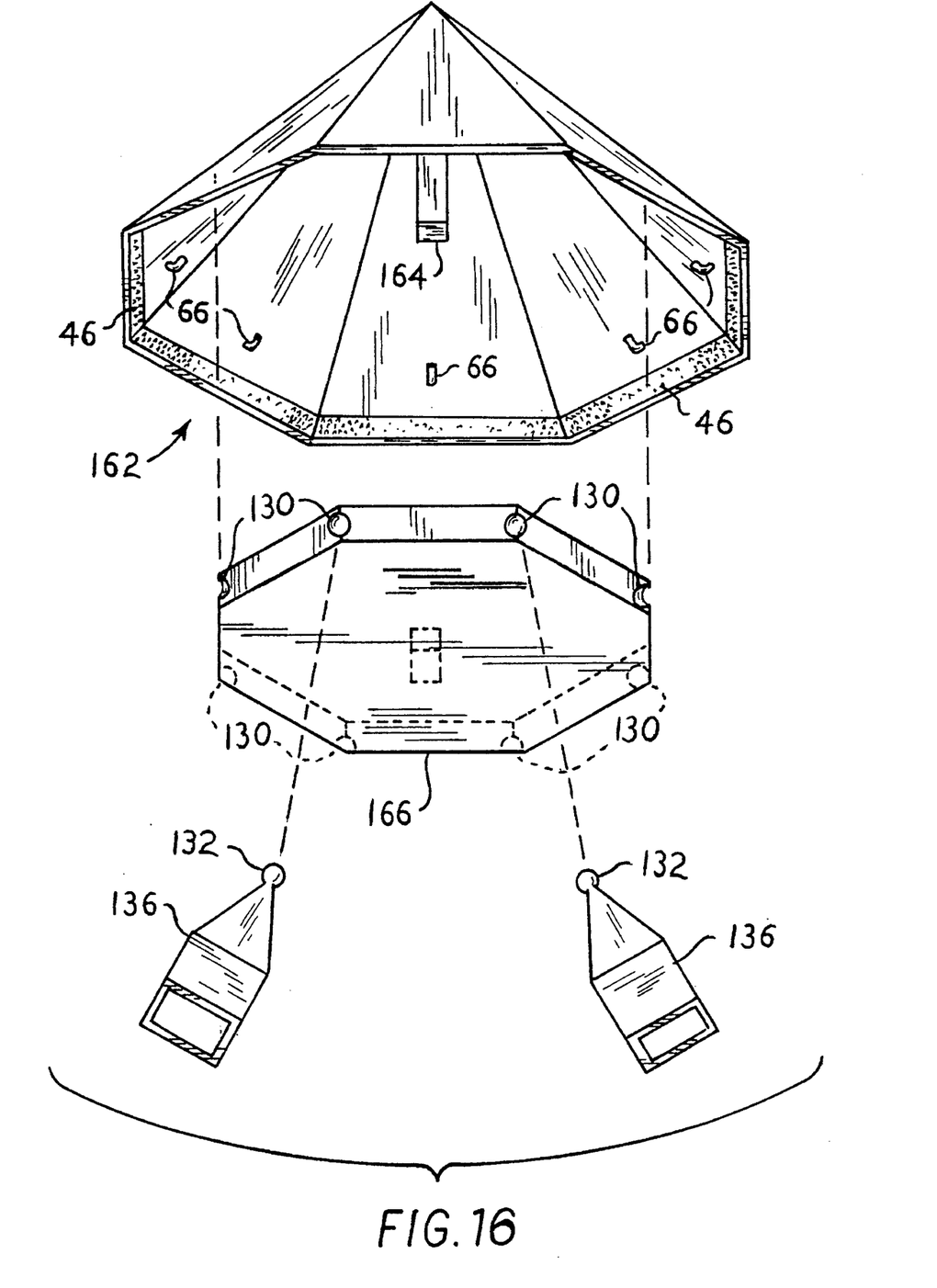
FIG. 16 is an exploded bottom and side perspective view of an alternative embodiment for an octagon roof connector cap, showing an intermediate attachment plate and spherical connectors hereto.

A similar configuration may be provided for an octagonal roof cap 162, as shown in FIG. 16 (or for trapezoid or other roof cap configurations, as desired), for the same purpose. The octagonal cap 162 of FIG. 16 is devoid of rafter sockets, but includes a central post or column 164, which is adapted to fit an octagon roof cap strut adapter 166. The octagon adapter 166 in turn includes eight sockets 130 therearound, adapted to fit the spherical connectors 132 on the ends of the strut end fittings 136 (which are essentially identical to the rectangular cross section central support column fitting 136 of FIG. 11). As in the case of other roof ridge or cap components, hooks 66 and hook and loop fastening material 46 is provided adjacent the inner periphery of the cap 162, to which the upper ends of the corresponding roof panels 26 may be secured and sealed. However, the cap 162 and its spherical strut fitting adapter plate 166, allow the struts to be secured to the octagonal cap 162 at virtually any practicable angle, depending upon the width of the octagonal structure and the length of the struts used. The spherical fitting adapter configuration may be used with other cap configurations (trapezoidal, etc.) also.

In summary, the present modular building system will be seen to provide a variety of structures from a relatively limited number of components, with the structures being limited only by the desires and imagination of the builder. The present building system is particularly adapted to the construction of relatively lightweight, temporary or semi-permanent structures for use as supplementary structures for residential use, e.g., greenhouses, storage sheds, gazebos, porch enclosures, sun rooms, framed tents, etc. The retractable and extendible wall and roof panels incorporated with structural members, provides for ease of closure and opening of any structures constructed using the present system, as desired. Thus, a structure may be opened to allow cool breezes or warm sunshine to enter as desired, but may be quickly closed to exclude rain, dust, wind, extremes of heat or cold, insects, or other undesirable elements as desired.

In many cases, it may be desirable to change the wall and/or roof panels from time to time, depending upon the environment and season. For example, transparent but impervious panels (e.g., clear plastic) may be desired for a greenhouse in winter, but screened panels may be more desirable for summer use. The present invention allows such wall and roof panels to be easily removed from their respective base and header plate members, or for the removal and replacement of the base and header plate members, for exchange as desired. Moreover, any structures built according to the present invention may be readily disassembled, moved to a different location, and/or reassembled to reform the same structure or to construct a different structure, as desired. The versatility and ease of use of the present structural system provides innumerable benefits to the user thereof.

It is to be understood that the present invention is not limited to the sole embodiments described above, but encompasses any and all embodiments within the scope of the following claims.

I claim:

1. A modular building structure, comprising:

a plurality of elongate hollow base plate members and header plate members, with each of said base plate members and header plate members respectively including an integral flexible wall panel and roof panel selectively extendible therefrom and retractable therein;

a plurality of elongate hollow stud members and rafter members, and;

a plurality of connectors connecting said base plate members to said stud members, said stud members to said header plate members, and said header plate members to said rafter members to form said modular building structure, whereby;

a temporary, lightweight modular building structure including selectively retractable and extendible wall panels and roof panels is provided, with said wall panels and said roof panels providing for the selectable opening or closure of said modular building structure as desired.

2. The modular building structure of claim 1, wherein:

at least some of said roof panels are tapered to provide a triangular configuration conforming to triangular roof openings when said at least some roof panels are extended to close said triangular roof openings.

3. The modular building structure of claim 1, including:

a plurality of elongate roof crest members each providing for the attachment of at least one extended said roof panel thereto.

4. The modular building structure of claim 3, including:

a plurality of roof crest member connectors each providing for the connection of two said roof crest members together, with said roof crest member connectors each having spherical socket means, and;

said rafter members each include a spherical end fitting to connect with said spherical socket means of said roof crest member connectors and to provide rafter connection means to said roof crest member connectors and hence to said roof crest members.

5. The modular building structure of claim 1, wherein:

at least some of said rafter members comprise at least two relatively telescoping components, with said telescoping components providing for the adjustability of the length of said at least some rafter members.

6. The modular building structure of claim 1, including:

at least one elongate roof crest member, with said roof crest member being assembled with at least some of said rafter members to form a gabled roof structure.

7. The modular building structure of claim 1, including:

at least one octagon roof cap member, with said octagon roof cap member being assembled with at least some of said rafter members to form an octagon roof structure.

8. The modular building structure of claim 1, including:

at least one trapezoid roof cap member, with said trapezoid roof cap member being assembled with at least some of said rafter members to form a trapezoid roof structure.

9. The modular building structure of claim 1, including:

at least one half octagon roof cap member, with said half octagon roof cap member being assembled with at least some of said rafter members to form a hip roof structure.

10. The modular building structure of claim 1, wherein:

said connectors each include locking means adapted to lock and secure at least said base plate members and said header plate members to respective said connectors.

11. The modular building structure of claim 1, wherein:

said base plate members and said header plate members are removable from respective said connectors without need for further disassembly of said modular building structure.

12. The modular building structure of claim 1, wherein:

each of said wall panels and said roof panels is respectively removable from said base plate members and said header plate members.

13. The modular building structure of claim 1, wherein:

each of said base plate members and said header plate members respectively contains a base plate roller and a header plate roller therein, with each said base plate roller and each said header plate roller respectively having one of said wall panels and one of said roof panels secured thereto, and;

each of said panels being selectively extendible and retractable from a respective said roller respectively by unrolling from said roller and winding onto said roller, with each said roller including spring means urging a respective each of said panels to a rolled configuration thereon and to be retracted within a respective one of said plate members until being selectively extended therefrom.

14. The modular building structure of claim 1, including:

a door module, comprising a threshold member, spaced apart first and second lateral door frame members having a door hingedly attached therebetween, and a header plate member.

15. The modular building structure of claim 1, including:

a plurality of stud member sleeves and rafter member sleeves respectively disposed about each of said stud members and each of said rafter members, with said stud member sleeves and said rafter member sleeves providing for the respective attachment of said wall panels and said roof panels to said stud members and to said rafter members.

16. The modular building structure of claim 15, wherein:

said stud member sleeves and said rafter member sleeves respectively include wall panel and roof panel sealing means therealong, and said wall panels and said roof panels each respectively include cooperating stud member sleeve and rafter member sleeve sealing means therealong, with said sealing means comprising zipper and hook and loop fastening material and providing for the respective sealing of said wall panels to said stud member sleeves and said roof panels to said rafter member sleeves to preclude entry of undesirable elements into a closed said modular building structure.

17. The modular building structure of claim 1, wherein:

each of said wall panels and said roof panels are selected from the group comprising opaque sheet, translucent sheet, transparent sheet, woven fabric, plastic screen, and metal screen.

18. The modular building structure of claim 1, wherein:

said base plate members, header plate members, stud members, rafter members, and connectors are formed of plastic.

19. The modular building structure of claim 1, wherein:

each of said base plate members, header plate members, stud members, rafter members, and connectors has a rectangular cross section.

20. The modular building structure of claim 1, wherein:

each of said base plate members, header plate members, stud members, rafter members, and connectors has a round cross section.

* * * * *